United States Patent
Steele et al.

(10) Patent No.: US 11,913,431 B2
(45) Date of Patent: Feb. 27, 2024

(54) WIND TURBINE OSCILLATION DETECTION

(71) Applicant: VESTAS WIND SYSTEMS A/S, Aarhus N. (DK)

(72) Inventors: David Steele, Skanderborg (DK); Kristian Kiib, Skødstrup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/791,157

(22) PCT Filed: Jan. 5, 2021

(86) PCT No.: PCT/DK2021/050003
§ 371 (c)(1),
(2) Date: Jul. 6, 2022

(87) PCT Pub. No.: WO2021/139863
PCT Pub. Date: Jul. 15, 2021

(65) Prior Publication Data
US 2023/0021757 A1    Jan. 26, 2023

(30) Foreign Application Priority Data
Jan. 6, 2020 (DK) .......................... PA 2020 70004

(51) Int. Cl.
*F03D 7/04* (2006.01)
*F03D 1/02* (2006.01)
*F03D 7/02* (2006.01)

(52) U.S. Cl.
CPC ............... *F03D 7/047* (2013.01); *F03D 1/02* (2013.01); *F03D 7/0276* (2013.01)

(58) Field of Classification Search
CPC ........... F03D 7/047; F03D 1/02; F03D 7/0276
See application file for complete search history.

(56) References Cited

U.S. PATENT DOCUMENTS

2015/0142191 A1*  5/2015  Bengtson ................ F03D 7/042
                                              700/287
2018/0017042 A1*  1/2018  Baun ..................... H02K 7/1838
(Continued)

FOREIGN PATENT DOCUMENTS

EP          3591218 A1    1/2020
WO    2017202944 A1    11/2017
(Continued)

OTHER PUBLICATIONS

Danish Patent and Trademark Office, 1st Technical Examination including The Search Report and Search Opinion for Application PA 2020 70004 dated Jun. 11, 2020.
(Continued)

*Primary Examiner* — Viet P Nguyen
(74) *Attorney, Agent, or Firm* — Patterson + Sheridan, LLP

(57) ABSTRACT

A wind turbine comprising: a tower; a first arm extending from the tower; a first rotor-nacelle assembly disposed on the first arm; a first movement sensor disposed on the first arm or on the first rotor-nacelle assembly and arranged to generate first movement data based on movement of the first arm or of the first rotor-nacelle assembly; a second arm extending from the tower; a second rotor-nacelle assembly disposed on the second arm; a second movement sensor disposed on the second arm or on the second rotor-nacelle assembly and arranged to generate second movement data based on movement of the second arm or of the second rotor-nacelle assembly; and a control system coupled to the first and the second movement sensors and arranged to receive and to process the first and second movement data; wherein the control system is arranged to determine an oscillation characteristic of the wind turbine from the first and the second movement data.

20 Claims, 6 Drawing Sheets

(56) References Cited

U.S. PATENT DOCUMENTS

2018/0283355 A1    10/2018  Miranda
2018/0347544 A1 *  12/2018  Grunnet ................ F03D 7/0296

FOREIGN PATENT DOCUMENTS

| WO | 2017202945 A1 | 11/2017 | | |
|---|---|---|---|---|
| WO | WO-2017202944 A1 * | 11/2017 | .............. | F03D 1/02 |
| WO | 2018145710 A1 | 8/2018 | | |
| WO | 2020007431 A1 | 1/2020 | | |
| WO | 2021139863 A1 | 7/2021 | | |

OTHER PUBLICATIONS

PCT, International Search Report for Application PCT/DK2021/050003 dated Aug. 4, 2021.
PCT, Written Opinion of The International Searching Authority for Application PCT/DK2021/050003 dated Aug. 4, 2021.

\* cited by examiner

WIND TURBINE OSCILLATION DETECTION

FIELD OF THE INVENTION

The present invention relates to a wind turbine, a method of monitoring a wind turbine, a method of controlling a wind turbine, and a computer program product for carrying out such methods.

BACKGROUND OF THE INVENTION

It is known that wind turbines may move due to the force of wind incident upon the wind turbine and that the movement may take the form of bending of a tower of the wind turbine. The movement may result in an oscillation in a resonant mode of the wind turbine. Such resonant oscillations may potentially be damaging for a wind turbine.

When the wind turbine is a traditional wind turbine, having a single rotor at the top of a tower, the wind turbine may be considered as an inverted pendulum and the number of oscillation modes and the complexity of those oscillation modes may be relatively small. However, multi-rotor turbines may have more complex oscillation modes. In particular, there may be significant oscillation modes in which a nacelle at the top of the tower remains substantially stationary and measurement of the movement of the top nacelle therefore may not provide meaningful data for determining some oscillation modes.

Some existing systems for determining wind turbine movement use strain sensors arranged on the structure of the tower. However, strain sensors may have slow response times and may thereby provide inadequate data for a determination to be made for characteristics of complex or high frequency oscillations.

SUMMARY OF THE INVENTION

A first aspect of the invention provides a wind turbine comprising: a tower; a first arm extending from the tower; a first rotor-nacelle-assembly disposed on the first arm; a first movement sensor disposed on the first arm or on the first rotor-nacelle-assembly and arranged to generate first movement data based on movement of the first arm or of the first rotor-nacelle-assembly; a second arm extending from the tower; a second rotor-nacelle-assembly disposed on the second arm; a second movement sensor disposed on the second arm or on the second rotor-nacelle-assembly and arranged to generate second movement data based on movement of the second arm or of the second rotor-nacelle-assembly; and a control system coupled to the first and the second movement sensors and arranged to receive and to process the first and second movement data; wherein the control system is arranged to determine an oscillation characteristic of the wind turbine from the first and the second movement data.

With such an arrangement, data from two separate movement sensors may be combined in order to determine characteristics of a greater range of oscillation modes.

The oscillation characteristic determined may provide an indication of the structural integrity of the tower and/or the likelihood of any damage to the tower occurring due to the movement of the tower.

The first and second movement sensors may be configured to be time synchronous with each other and/or with the control system. The first and the second movement sensors and the control system may form part of a time triggered network, optionally a time triggered Ethernet network.

The first and the second movement sensors may each comprise an accelerometer and/or a gyroscope.

The first and the second movement sensors may each comprise a gyroscope and an accelerometer and the first and the second movement data may each comprise linear acceleration data and angular velocity data and/or angular acceleration data.

The control system may comprise a first processor disposed on the first arm or on the first rotor-nacelle-assembly and/or a second processor which may be disposed on the second arm or on the second rotor-nacelle-assembly, wherein the first and the second processors may be arranged to process the first and the second movement data respectively.

The control system may comprise a processing unit disposed on or within the tower, the processor arranged to determine the oscillation characteristic.

The oscillation characteristic may be an oscillation mode or an oscillation amplitude.

The control system may be arranged to control a wind turbine operation parameter to modify an oscillation of the wind turbine on the basis of the oscillation characteristic.

The wind turbine may comprise an actuator and each rotor-nacelle-assembly may comprise a respective rotor, and controlling the wind turbine operation parameter may comprise: driving the actuator to alter a pitch of the blades of at least one of the rotors, or driving the actuator to yaw at least one of the rotor-nacelle-assemblies.

The wind turbine may further comprise a generator, which may be situated within a nacelle of one of the rotor-nacelle-assemblies, and controlling the wind turbine operation parameter may comprise modifying a power set point and/or a rotational speed of the generator.

The wind turbine may further comprise a memory storing possible oscillation modes of the wind turbine, and a control system may be arranged to determine an amplitude, frequency, or phase of at least one of the stored oscillation modes.

The first and/or second arms may extend non-vertically, optionally substantially horizontally, away from the tower.

According to a second aspect of the invention, there is provided a method of monitoring a wind turbine, the wind turbine comprising a tower and a first and a second arm extending from the tower, each arm carrying a respective rotor-nacelle-assembly, the method comprising: generating first movement data based on movement of the first arm or of the first rotor-nacelle-assembly of the wind turbine by a first movement sensor; generating second movement data based on movement of the second arm or of the second rotor-nacelle-assembly of the wind turbine by a second movement sensor; and determining an oscillation characteristic of the wind turbine based on the first and the second movement data.

The method may further comprise: identifying a first oscillation in the first movement data, identifying a second oscillation in the second movement data, and determining a phase difference between the first and the second oscillations, and the determination of the oscillation characteristic may be based at least partially on the phase difference.

The determining may comprise interrogating a database comprising possible oscillation modes.

According to a third aspect of the invention, there is provided a method of controlling a wind turbine, comprising: monitoring the wind turbine according to the second aspect of the invention; and controlling a wind turbine operation parameter based on the oscillation characteristic in order to modify an oscillation of the wind turbine.

Controlling the wind turbine parameter may comprise altering the pitch of a blade of the wind turbine or yawing at least one rotor-nacelle-assembly.

Controlling the wind turbine oscillation parameter may comprise modifying a power set point or a rotational speed of a generator.

According to a fourth aspect of the invention, there is provided a computer program product comprising software code adapted to control a wind turbine when executed on a data processing system, the computer program product being adapted to perform the method of the second or third aspects.

The computer program product may be a processor arranged to carry out the method when coupled to a suitable wind turbine or may be a non-transitory computer readable medium including instructions, which, when carried out on a processor, cause the processor to carry out the method according to the second or third aspects.

BRIEF DESCRIPTION OF THE DRAWINGS

Embodiments of the invention will now be described with reference to the accompanying drawings, in which.

DETAILED DESCRIPTION OF EMBODIMENTS

Figure 1A:
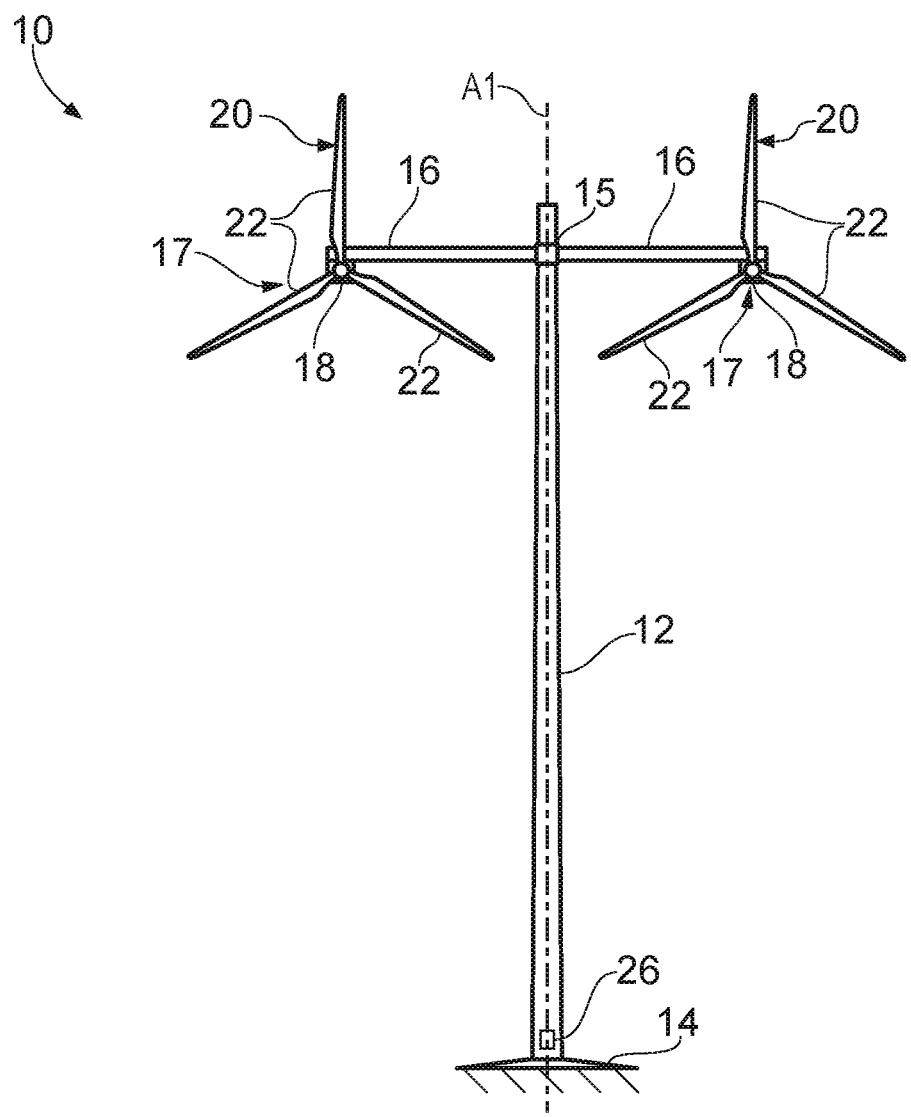
FIG. 1A is a front view of a multi rotor wind turbine.

FIG. 1A shows a multi-rotor wind turbine 10. A multi-rotor wind turbine is any wind turbine with at least two rotor-nacelle-assemblies, which distinguishes the wind turbine from a traditional, single-rotor wind turbine. Multi-rotor wind turbines may have significantly different oscillation modes from single-rotor wind turbines and therefore oscillation detection systems of single-rotor wind turbines may not be suitable or adaptable for use on multi-rotor wind turbines.

The wind turbine 10 shown in FIG. 1A has a central tower 12 extending upwardly from a foundation 14 along a central axis A1 and first and second arms 16 extending from the tower 12. While the first and second arms 16 are shown as extending substantially horizontally from the tower, it will be understood that the arms may extend non-horizontally and may extend diagonally upwardly or diagonally downwardly from the tower 12.

The first and second arms 16 may be coupled to the tower 12 via a rotatable collar 15. The collar 15 may be arranged to rotate about the tower 12 in order that the rotors 20 of the wind turbine 10 face more directly into incident wind and the wind turbine may thereby achieve improved energy production.

Figure 1B:
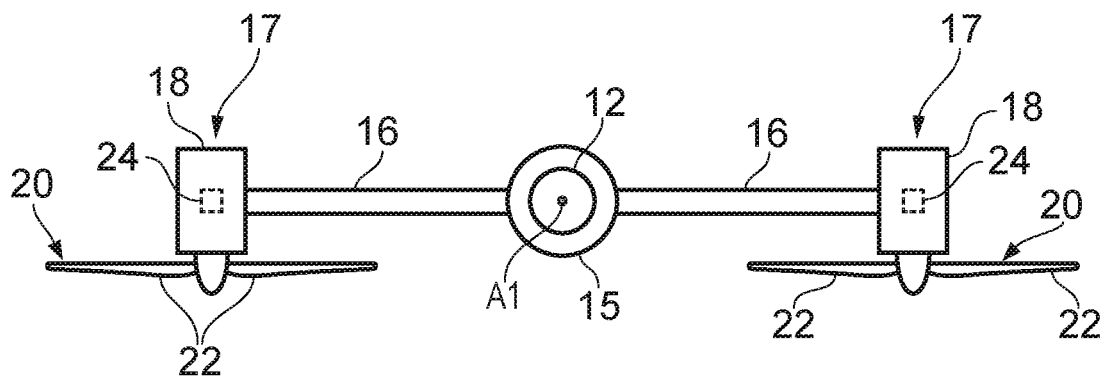
FIG. 1B is a plan view of the multi rotor wind turbine.

At the ends of each of the arms 16, there may be disposed respective rotor-nacelle-assemblies 17, comprising respective nacelles 18 and respective rotors 20. As shown in FIG. 1B there may be first and second monitoring units 24 disposed on the nacelles 18. Alternatively, the monitoring units 24 may be disposed on the arms 16. Generally, the monitoring units 24 may be arranged to measure or detect movement of the arms 16 and the respective nacelles 18 mounted on the arms 16. The monitoring units 24 may be disposed on a surface of the arms 16 or nacelles 18 or may be embedded or otherwise placed inside the arms 16 or nacelles 18.

Rotatably coupled to each nacelle 18 is a respective rotor 20, which is arranged to rotate in order to drive a generator and thereby to generate electricity. Each rotor 20 has a plurality of wind turbine blades 22, which are arranged to create lift due to incident wind and may thereby cause the rotors 20 to rotate. While rotors with three blades are shown, it will be understood that rotors having more or fewer blades may equally be used.

The wind turbine may also have a central processing unit 26. The central processing unit 26 may be disposed at a base of the tower 12, proximate the foundation 14, or may be disposed elsewhere on or in the wind turbine 10. The central processing unit 26, in conjunction with the first and second monitoring units 24 may form at least a part of a control system, which is described in more detail below.

Figure 2:
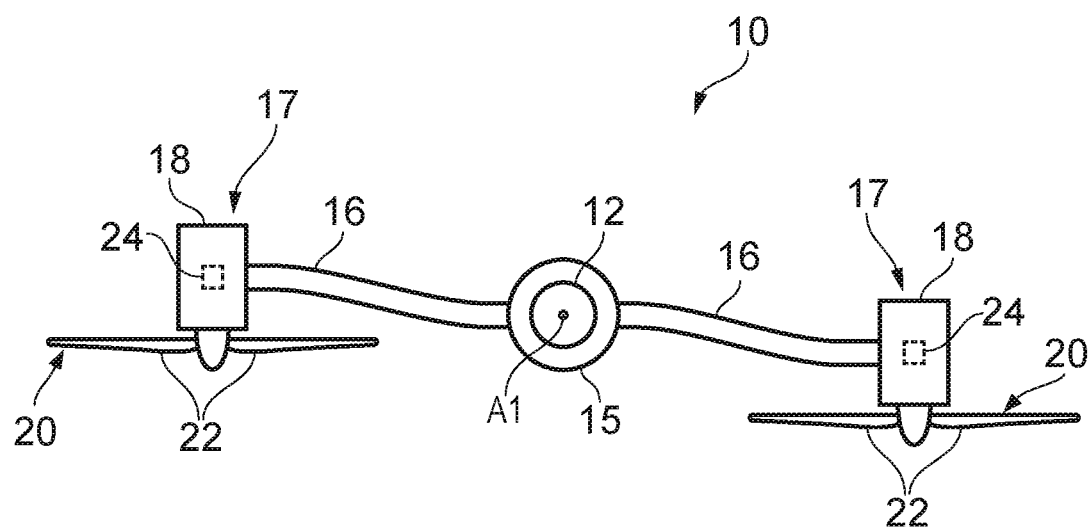
FIG. 2 is a plan view of the multi rotor wind turbine when oscillating.

FIG. 2 shows an example of an oscillation mode which may be encountered by a multi-rotor wind turbine. Due to the thrust caused by incident wind on the rotors 20 and the weight of the rotor-nacelle-assemblies 17, as well as the length of the arms 16, a significant torque may be created about the central axis A1 of the wind turbine 10. This may cause bending of the arms 16 and/or torsion of the central tower 12. As the bending may be opposed by the structure of the wind turbine 10, and the bending force may change over time due to changing wind speed or direction and/or vibration of the rotor-nacelle-assemblies due to rotation of the rotors 20, the bending of the arms 16 and torsion of the tower 12 may develop into an oscillation.

In FIG. 2, it can be seen that the oscillation of the wind turbine 10 is related to the movement of the arms 16 and of the rotor-nacelle-assemblies 17. The monitoring units 24 may measure this movement and may provide movement data to a control system. Such movement data may provide useful information for determining the characteristics of the oscillation of the wind turbine 10. For example, the predominant oscillation mode may be determined, and may be characterised by, the frequency, the amplitude, and/or the phase of the oscillation.

The oscillation mode may involve torsion of the tower 12. Such torsion may be more reliably detected by using movement data from both of the monitoring units 24 on the two different rotor-nacelle-assemblies 17. Moreover, detection of torsion in the tower 12 may be assisted by a time-synchronous network, which may provide more accurate information regarding the phase of the movement of the arms 16. This may allow determination of whether the movement is symmetrical or asymmetrical about the tower 12.

Figure 3:
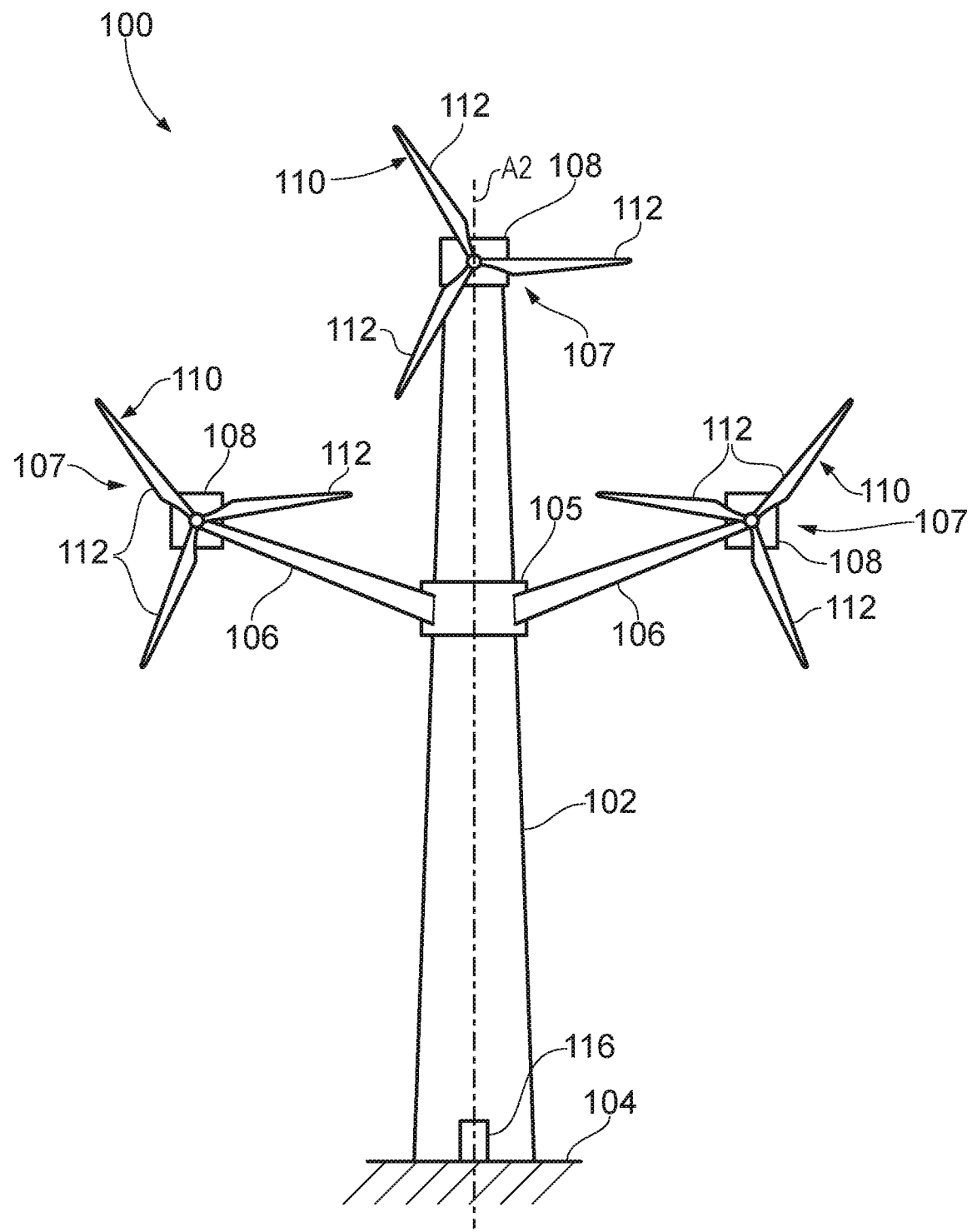
FIG. 3 is a front view of an alternative multi rotor wind turbine.

FIG. 3 shows a second multi-rotor wind turbine 100, having a third rotor-nacelle-assembly 107 at the top of a tower 102, in addition to two rotor-nacelle-assemblies 107 on the ends of arms 106.

Parts of the wind turbine 100 shown in FIG. 3 may be substantially similar to parts of the wind turbine 10 shown in FIG. 1A and so substantially unchanged parts are not described again here for brevity.

The top rotor-nacelle-assembly 107 may be substantially similar to the rotor-nacelle-assemblies 17 of the wind turbine 10 of FIG. 1A and to the rotor-nacelle-assemblies 107 on the arms 106 of the wind turbine 100 of FIG. 3.

The arms 106 may extend substantially horizontally, or diagonally upwardly or downwardly, from a mid-point on the tower 102. The arms 106 may be coupled to a rotatable collar 105 arranged to yaw the arms 106 and the rotor-nacelle-assemblies 107 coupled to the arms 106.

Each rotor-nacelle-assembly 107 may have a monitoring unit 24 (not shown in FIG. 3), arranged to measure movement of the rotor-nacelle-assembly 107. The monitoring units 24 may be substantially similar to the monitoring units 24 described in conjunction with the wind turbine 10 of FIG. 1A. The monitoring units 24 may be coupled to a central processing unit 116 and may be coupled via a time-synchronous network. The monitoring units 24, the network and the central processing unit 116 may form a control system.

Figure 4:
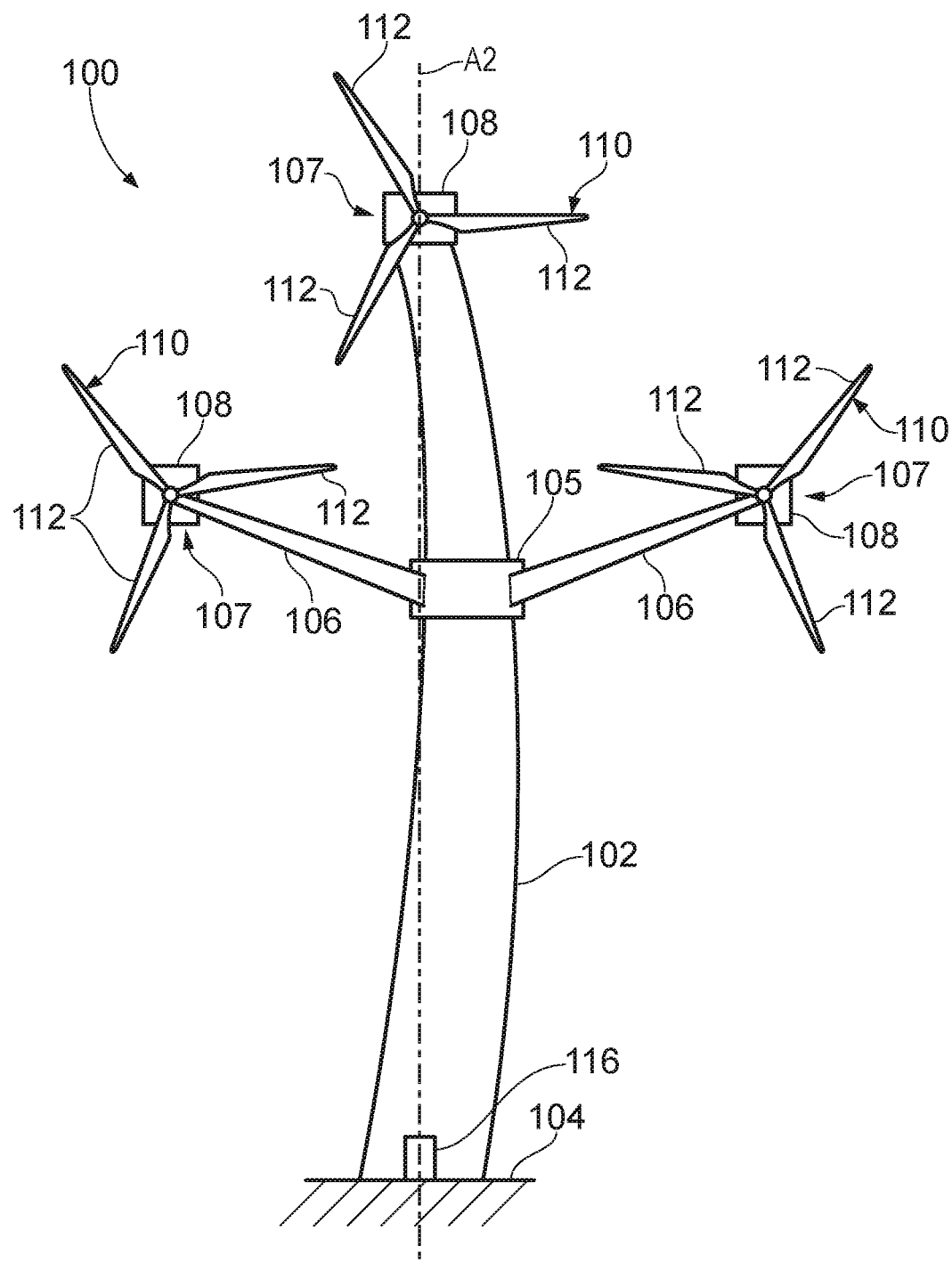
FIG. 4 is a front view of the alternative wind turbine when oscillating.

FIG. 4 shows a wind turbine 100 in an oscillation mode known colloquially as a "belly dancer" mode. In this oscillation mode, the wind turbine may oscillate with a wavelength twice the height of the wind turbine 100, meaning that the top rotor-nacelle-assembly 107 may sit at a node and may remain substantially stationary while the central tower 102 oscillates. Therefore, if a traditional wind turbine monitoring system were used, incorporating only a measurement sensor at the top rotor-nacelle-assembly 107, this oscillation mode may not be detected. However, by using measurements from monitoring units 24 mounted to each of the rotor-nacelle-assemblies 107 and/or on the arms 106, this bending mode may be detected.

Figure 5:
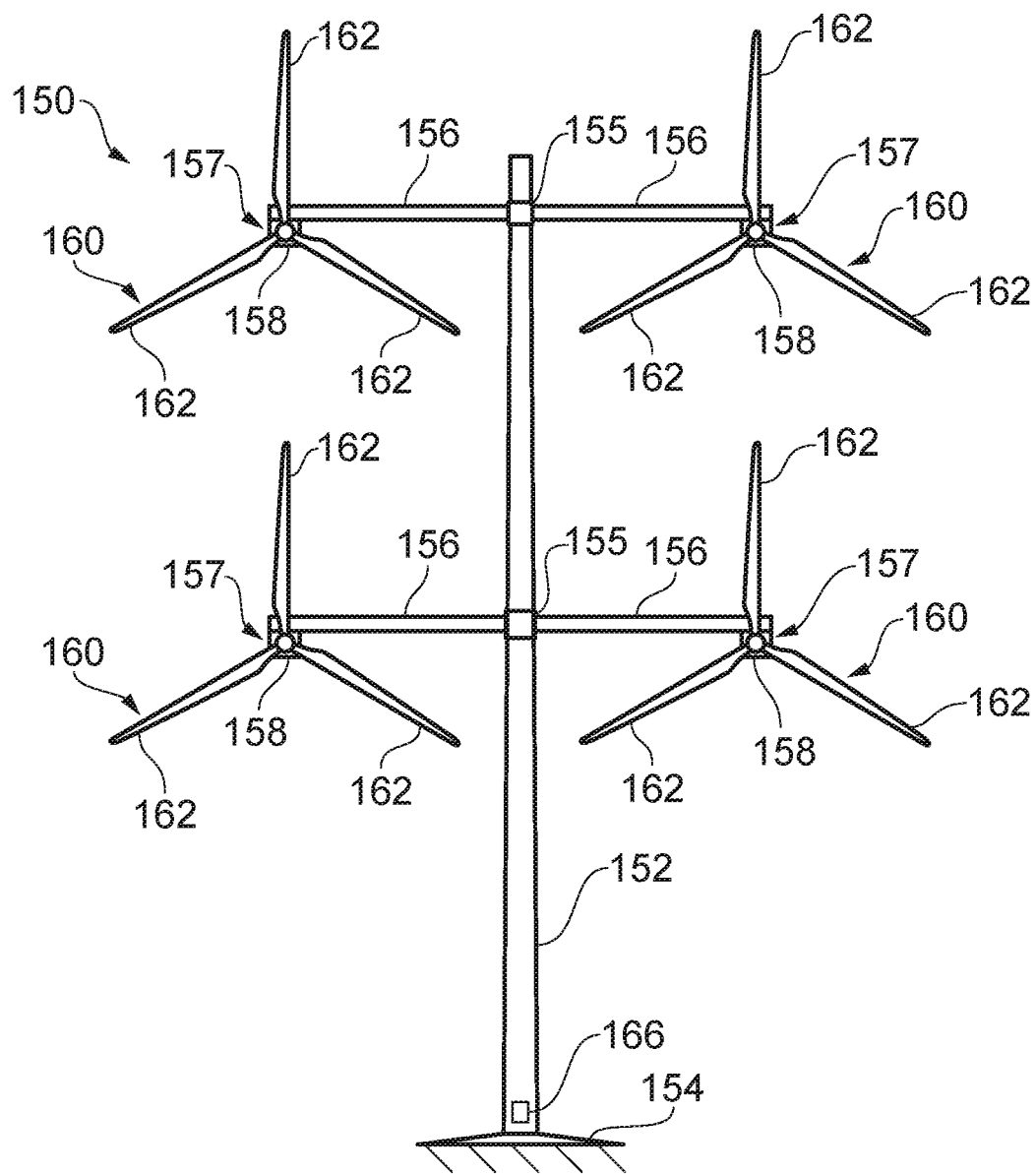
FIG. 5 is a front view of a further alternative wind turbine.

A further alternative multi-rotor wind turbine 150 is shown in FIG. 5. The wind turbine 150 has a main tower 152 extending upwardly from a foundation 154. The wind turbine has four rotor-nacelle-assemblies 157, which are arranged in two separate, vertically spaced rows. An upper row has a rotatable collar 155 coupled to the main tower 152 and two arms 156 extend outwardly from the collar 155. Each arm 156 supports a respective rotor-nacelle-assembly. The wind turbine 150 also has a lower row, which may be substantially similar to the upper row, with two rotor-nacelle assemblies 157 supported by two respective arms 156, which extend from a rotatable collar 155, the rotatable collar 155 being coupled to the main tower 152.

Each rotor nacelle assembly 157 may have a nacelle 158 mounted on an arm 156 and a rotor 160 rotatably coupled to the nacelle 158. The rotor 160 may have blades 162 arranged to generate lift when wind is incident upon the blades 162 so as to rotate the rotor 160 and to generate electricity by transferring rotational kinetic energy to a generator inside the nacelle 158.

The wind turbine 150 of FIG. 5 may have movement sensors on or in the nacelles 158 and/or on or in the arms 156 and arranged to detect movement of the nacelles 158 and/or the arms 156. The movement sensors may output movement data, which may be analysed locally or by a central processing unit 166 in the main tower 152. The wind turbine 150 may have four movement sensors, each sensor being arranged to detect movement of a respective arm 156 or nacelle 158.

The movement sensors and central processing unit 166 may form a control system similar to those of the first- and second-described wind turbines 10, 100. Such a control system may be arranged to detect oscillations in the tower, which may be those shown in either of FIG. 2 or 4. Further, more complex oscillations may also occur within the wind turbine 150 due to the number of nacelles and their distance from the main tower 152. The oscillations may be detected by combining data from the movement sensors.

The wind turbine 150 may further comprise a further rotor-nacelle-assembly disposed at the top of the main tower 152. Such a top rotor-nacelle-assembly may be substantially similar to the other rotor-nacelle-assemblies 157 and may have a further movement sensor, which may be part of the control system described above.

Figure 6:
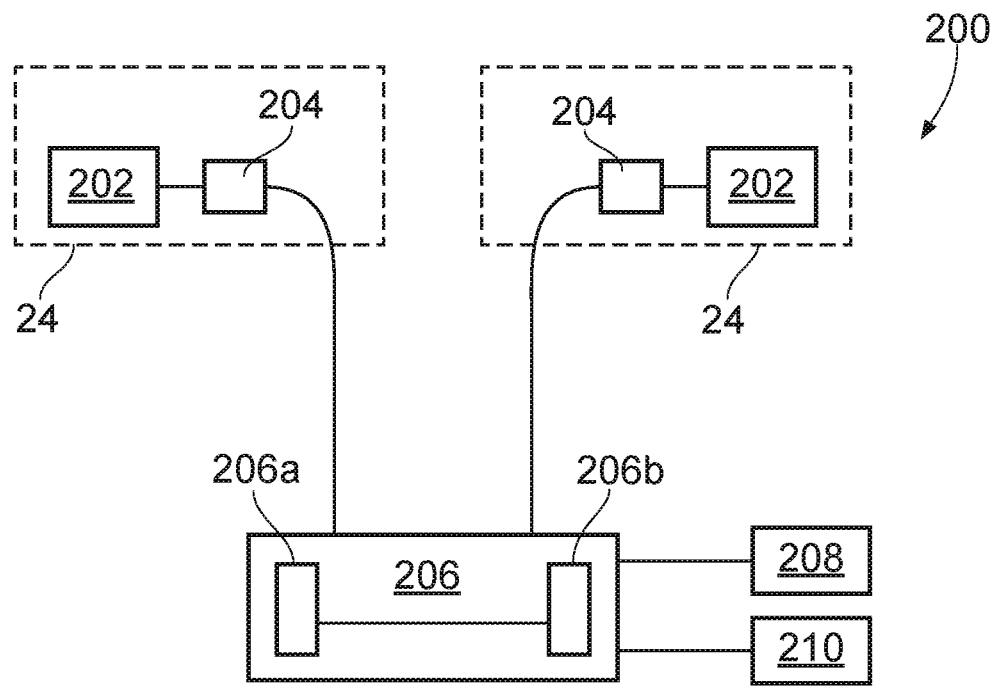
FIG. 6 is a schematic diagram of a control system of use on a wind turbine.

FIG. 6 shows a schematic diagram of a control system 200, comprising monitoring units 24 of the wind turbine. It will be understood that control systems may have more than two monitoring units 24, for example with wind turbines having a greater number of rotor-nacelle-assemblies. The control system 200 may also comprise more than one monitoring unit 24 per rotor-nacelle-assembly and/or may comprise one or more monitoring units 24 within a central tower 12, 102, 152.

Each monitoring unit 24 may comprise a movement sensor 202 and a processor 204. The movement sensor 202 may be an accelerometer, a gyroscope, or may comprise multiple accelerometers and/or gyroscopes.

The processors 204 disposed within the monitoring units 24 may perform preliminary data processing of the data from the movement sensors 202, such as compression and/or time-stamping of the data. The data transmission along the network of the control system 200 may therefore be improved.

The control system 200 also comprises a central processing unit 206, which has a processor 206a and a memory 206b. The memory 206b may store instructions, which when carried out by the processor 206a cause the control system 200 to operate.

The control system 200 may operate to drive one or more actuators 208. The driving of the actuators 208 may alter the oscillation of the wind turbine.

The actuators 208 may be blade pitch actuators, arranged to alter the blade pitch such that the angle of attack relative to incident wind on the blade may change, or may be yaw actuators arranged to yaw the collar 15, 105, 155 of the wind turbine, in order to move the rotors 20, 110 out of incident wind, or in the case of a multi-rotor wind turbine 100 with a top rotor 110, to yaw the top rotor 110 on the main tower 102 out of the wind.

Alternatively or additionally, the control system 200 may be coupled to a generator 210 and may be arranged to change a generator set point, a generator rotational speed or a generator power output.

Optionally, the control system 200 may be arranged to communicate with an adjacent wind turbine and may alter the properties of wind incident on the wind turbine 100 by changing operating parameters of an upwind wind turbine.

The control system 200 may have a time synchronous network, which may be a deterministic time-synchronous network and may be a time-triggered Ethernet network, and may calculate latency within the network and may thereby make adjustments for time differences of signals received at the central processing unit 206 from the monitoring unit 24. This may improve determination of oscillation characteristics such as phase differences between movements of different rotor-nacelle-assemblies 17 and/or different wind turbine arms 16, 106, 156.

Movement data may be transferred between monitoring units 24 via a network and not necessarily directly to a central processing unit. The central processing unit 206 may be omitted in control systems with distributed processing within the monitoring units 24.

Figure 7:
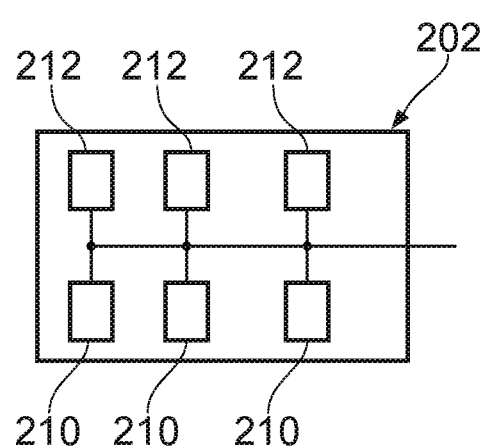
FIG. 7 is a schematic diagram of a movement sensor for use in the control system.

FIG. 7 shows a schematic diagram of an example movement sensor 202 comprising three accelerometers 210, each accelerometer 210 being arranged to detect acceleration in a different, orthogonal direction and three gyroscopes 212, each gyroscope 212 being arranged to detect an angular velocity and/or an angular acceleration about a different orthogonal axis.

While the illustrated embodiments show wind turbines having only two, three, and four rotor-nacelle-assemblies, it will be understood that wind turbine assemblies having 2, 4, 6 or 8 arms may be used and any of these numbers of arms may be combined with central rotor-nacelle-assemblies on the top of main towers of the wind turbines. It will also be understood that such wind turbines may have rotor-nacelle-assemblies arranged at different vertical locations, providing multiple rotatable collars when necessary. Overall, the above teaching is applicable to any configuration of wind turbine having at least two rotor-nacelle-assemblies.

Although the invention has been described above with reference to one or more preferred embodiments, it will be appreciated that various changes or modifications may be made without departing from the scope of the invention as defined in the appended claims.

The invention claimed is:

1. A wind turbine comprising:
a tower;
a first arm extending from the tower;
a first rotor-nacelle assembly disposed on the first arm;
a first movement sensor disposed on the first arm or on the first rotor-nacelle assembly and arranged to generate first movement data based on movement of the first arm or of the first rotor-nacelle assembly;
a second arm extending from the tower;
a second rotor-nacelle assembly disposed on the second arm;
a second movement sensor disposed on the second arm or on the second rotor-nacelle assembly and arranged to generate second movement data based on movement of the second arm or of the second rotor-nacelle assembly; and
a control system coupled to the first and the second movement sensors and arranged to receive and to process the first and second movement data,
wherein the control system comprises a time synchronous network and the first and second movement sensors are configured to be time synchronous with at least one of each other or the control system, and
wherein the control system is arranged to calculate latency within the time synchronous network to make adjustments for time differences of the first and second movement data received to determine an oscillation characteristic of the wind turbine from the first and the second movement data.

2. The wind turbine of claim 1, wherein the first and the second movement sensors and the control system form part of a time-triggered network.

3. The wind turbine of claim 1, wherein the first and the second movement sensors each comprise at least one of an accelerometer or a gyroscope.

4. The wind turbine of claim 3, wherein the first and the second movement sensors each comprise a gyroscope and an accelerometer and the first and the second movement data each comprise at least one of linear acceleration data, angular velocity, or angular acceleration data.

5. The wind turbine of claim 1, wherein the control system comprises at least one of: i) a first processor disposed on the first arm or on the first rotor-nacelle assembly; or ii) a second processor disposed on the second arm or on the second rotor-nacelle assembly, and wherein the first and the second processors are arranged to process the first and the second movement data respectively.

6. The wind turbine of claim 1, wherein the control system comprises a processing unit disposed within the tower, the processing unit is arranged to determine the oscillation characteristic.

7. The wind turbine of claim 1, wherein the oscillation characteristic is an oscillation mode or an oscillation amplitude.

8. The wind turbine of claim 1, wherein the control system is arranged to control a wind turbine operation parameter to modify an oscillation of the tower on a basis of the oscillation characteristic.

9. The wind turbine of claim 8, wherein the wind turbine comprises an actuator and each rotor-nacelle assembly comprises a respective rotor, and wherein controlling the wind turbine operation parameter comprises: driving the actuator to alter a pitch of blades of at least one of the rotors or driving the actuator to yaw at least one of the rotor nacelle assemblies.

10. The wind turbine of claim 8, further comprising a generator, and wherein controlling the wind turbine operation parameter comprises modifying a power set point and/or a rotational speed of the generator.

11. The wind turbine of claim 1, further comprising a memory storing possible oscillation modes of the tower, and wherein the control system is arranged to determine an amplitude, frequency, or phase of at least one of the possible oscillation modes.

12. The wind turbine of claim 1, wherein at least one of the first or second arms extend non-vertically, away from the tower.

13. The wind turbine of claim 1, wherein the first movement sensor is disposed on or embedded within the first rotor-nacelle assembly and the second movement sensor is disposed on or embedded within the second rotor-nacelle assembly.

14. A method of monitoring a wind turbine, the wind turbine comprising a tower and a first and a second arm extending from the tower, each arm carrying a respective rotor-nacelle assembly, the method comprising:
generating first movement data based on movement of the first arm or of a first rotor-nacelle assembly of the wind turbine by a first movement sensor;
generating second movement data based on movement of the second arm or of a second rotor-nacelle assembly of the wind turbine by a second movement sensor, wherein a control system of the wind turbine comprises a time synchronous network and the first and second movement sensors are configured to be time synchronous with at least one of each other or the control system, the control system is arranged to receive and process the first and second movement data; and
calculating latency within the time synchronous network to make adjustments for time differences of the first and second movement data received to determine an oscillation characteristic of the wind turbine based on the first and the second movement data.

15. The method of claim 14, further comprising:
identifying a first oscillation in the first movement data;
identifying a second oscillation in the second movement data; and
determining a phase difference between the first and the second oscillations, and
wherein the determination of the oscillation characteristic is based at least partially on the phase difference.

16. The method of claim 14, wherein to determine the oscillation characteristic, the method comprises interrogating a database containing possible oscillation modes.

17. A method of controlling a wind turbine, the wind turbine comprising a tower and a first and a second arm extending from the tower, each arm carrying a respective rotor-nacelle assembly, method comprising:
generating first movement data based on movement of the first arm or of a first rotor-nacelle assembly of the wind turbine by a first movement sensor;
generating second movement data based on movement of the second arm or of a second rotor-nacelle assembly of the wind turbine by a second movement sensor, wherein a control system of the wind turbine comprises a time synchronous network and the first and second movement sensors are configured to be time synchronous with at least one of each other or the control system, the control system is arranged to receive and process the first and second movement data;
calculating latency within the time synchronous network to make adjustments for time differences of the first and second movement data received to determine an oscillation characteristic of the wind turbine based on the first and the second movement data; and
controlling a wind turbine operation parameter based on the oscillation characteristic in order to modify an oscillation of the wind turbine.

18. The method of claim 17, wherein controlling the wind turbine operation parameter comprises altering a pitch of a blade of the wind turbine or yawing at least one rotor-nacelle assembly.

19. The method of claim 17, wherein controlling the wind turbine operation parameter comprises modifying a power set point or a rotational speed of a generator.

20. A computer program product comprising software code adapted to control a wind turbine when executed on a data processing system, the computer program product being adapted to perform an operation of monitoring a wind turbine, the wind turbine comprising a tower and a first and a second arm extending from the tower, each arm carrying a respective rotor-nacelle assembly, the operation comprising:
generating first movement data based on movement of the first arm or of a first rotor-nacelle assembly of the wind turbine by a first movement sensor;
generating second movement data based on movement of the second arm or of a second rotor-nacelle assembly of the wind turbine by a second movement sensor, wherein a control system of the wind turbine comprises a time synchronous network and the first and second movement sensors are configured to be time synchronous with at least one of each other or the control system, the control system is arranged to receive and process the first and second movement data; and
calculating latency within the time synchronous network to make adjustments for time differences of the first and second movement data received to determine an oscillation characteristic of the wind turbine based on the first and the second movement data.

* * * * *